(12) United States Patent
Gardner (10) Patent No.: US 8,442,115 B2
(45) Date of Patent: *May 14, 2013

(54) REDUNDANT DATA DISPERSAL IN TRANSMISSION OF VIDEO DATA BASED ON FRAME TYPE

(75) Inventor: James Gardner, Middletown, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,937

(22) Filed: Aug. 1, 2012

(65) Prior Publication Data

US 2013/0028320 A1    Jan. 31, 2013

Related U.S. Application Data

(63) Continuation of application No. 11/958,537, filed on Dec. 18, 2007, now Pat. No. 8,265,154.

(51) Int. Cl.
*H04N 7/12* (2006.01)
*H04N 11/02* (2006.01)
*H04N 11/04* (2006.01)

(52) U.S. Cl.
USPC .................................................. 375/240.14

(58) Field of Classification Search ............... 375/240.14
See application file for complete search history.

(56) References Cited

U.S. PATENT DOCUMENTS

| | | | |
|---|---|---|---|
| 5,734,826 | A | 3/1998 | Olnwich |
| 6,910,175 | B2 | 6/2005 | Krishnamachari |
| 2007/0019551 | A1 | 1/2007 | Pozhenko |
| 2007/0230496 | A1 | 10/2007 | Guo |
| 2008/0137728 | A1 | 6/2008 | Van Der Stok |

OTHER PUBLICATIONS

Bormann, "RTP Payload Format for the 1998 Version of ITU-T Rec. H.263 Video (H.263+)", Internet Engineering Task Force, Audio-Video Transport WG, draft-ietf-avt-rtp-h263-video-01.txt, Jan. 1998.
Champel, "Securing Video Contribution and Primary Distribution Over IP Networks", Thompson HD News, TV Technology, Aug. 2006.
Liu, "Using Redundancy to Repair Video Damaged by Network Data Loss", Damaged by Network Data Loss, Y. Liu et al.
Liu et al., "Video Redundancy—A Best-Effort Solution to Network Data Loss", Computer Science Department, Worcester Polytechnic Institute, p. 195.
Wong et al., "Redundant Array of Inexpensive Servers of On-Demand Multimedia Services", Advance Network Systems Laboratory, Department of Information Engineering, The Chinese University of Hong Kong, IEEE 1997, pp. 787-792.

*Primary Examiner* — Mark Rinehart
*Assistant Examiner* — Maharishi Khirodhar
(74) *Attorney, Agent, or Firm* — Guntin & Gust, PLC; Ralph Trementozzi (57) ABSTRACT

The transmitting end of a content distribution system selectively employs a redundancy mechanism to encode video data. In the event that a particular frame contains information upon which the decoding of multiple frames may depend, the transmitting end can apply a redundancy mechanism to redundantly distribute the data of the frame throughout a set of data segments, each of which is separately transmitted via the network to the receiving end. Otherwise, in the event that a particular frame to be transmitted does not contain substantial information upon which the decoding of multiple frames may depend, the loss of some or all of the data of the frame may not appreciably affect the presentation of the video content at the receiving end and thus the transmitting end can forgo application of the redundancy mechanism to such frames so as to avoid unnecessary processing and reduce the overall network bandwidth used.

20 Claims, 6 Drawing Sheets

REDUNDANT DATA DISPERSAL IN TRANSMISSION OF VIDEO DATA BASED ON FRAME TYPE

CROSS-REFERENCE TO RELATED APPLICATIONS

This application is a continuation of and claims priority to U.S. patent application Ser. No. 11/958,537 filed Dec. 18, 2007 which is incorporated herein by reference in its entirety.

FIELD OF THE DISCLOSURE

The present disclosure generally relates to the provision of video content, and more particularly, to the provision of video content via a network.

BACKGROUND OF THE DISCLOSURE

Data transmitted via a packet-switched network often is susceptible to packet loss, corruption, or excessive latency. Due to timing constraints and the sheer volume of data, data loss or delay in the transmission of encoded video data is particularly problematic. The loss of certain types of video information can result in significant visual artifacts in the presentation at the receiving end. Conventional data recovery techniques adapted for generalized data transmission, such as the use of high quality-of-service (QoS) circuits or the implementation of packet retransmission in accordance with the Telecommunications Communication Protocol (TCP), have the potential to ameliorate the risks of lost video data. However, the implementation of these general mechanisms may not be feasible due to cost or equipment availability. To illustrate, the particular network being used may implement the User Datagram Protocol (UDP), which does not provide a mechanism for the retransmission of lost packets. Further, these conventional data recovery techniques fail to take into account particular characteristics of encoded video data and therefore can inhibit the efficient transmission of the encoded video data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-7 illustrate example techniques for reliable transmission of encoded video data in a network subject to data loss, corruption, or excessive latency. In one embodiment, the transmitting end of a multimedia content distribution system selectively employs a redundancy mechanism to encoded video data on a frame-by-frame basis. In the event that a particular frame of the encoded video data contains substantial information upon which the decoding and subsequent processing of multiple frames may depend, such as intra coded frames ("I frames") or certain predictive coded frames ("P frames"), the transmitting end may employ a redundancy mechanism to distribute the data of the frame throughout a plurality of data segments, each of which is separately transmitted via the network to the receiving end. In at least one embodiment, the video information of the frame is dispersed with redundancy within the plurality of data segments such that a subset of at least a certain number of the data segments can be used at the receiving end to recover frame data represented by one or more data segments that were lost, corrupted, or delayed during transmission via the network. Otherwise, in the event that a particular frame to be transmitted does not contain substantial information upon which the decoding and subsequent processing of other frames may depend, such as bi-directional coded frames ("B frames") or certain other P frames, the loss of some or all of the data of the frame may not appreciably affect the presentation of the video content at the receiving end and thus the transmitting end may forgo application of the redundancy mechanism to the data of such frames so as to avoid unnecessarily processing and reduce the overall network bandwidth used to transmit the encoded video data to the receiving end. Moreover, by utilizing a redundancy mechanism for a frames, the reconstruction of a frame at the receiving end can be initiated once a sufficient number, but not all, of the data segments of the frame have been received.

For ease of illustration, certain techniques disclosed herein are described in an example context of an Internet Protocol Television (IPTV) network utilizing a set top box (STB) device to interface between a display device, such as a television or computer, and the multimedia content distribution network of a service provider. However, these techniques also can be implemented in other contexts without departing from the scope of the present disclosure.

Figure 1:
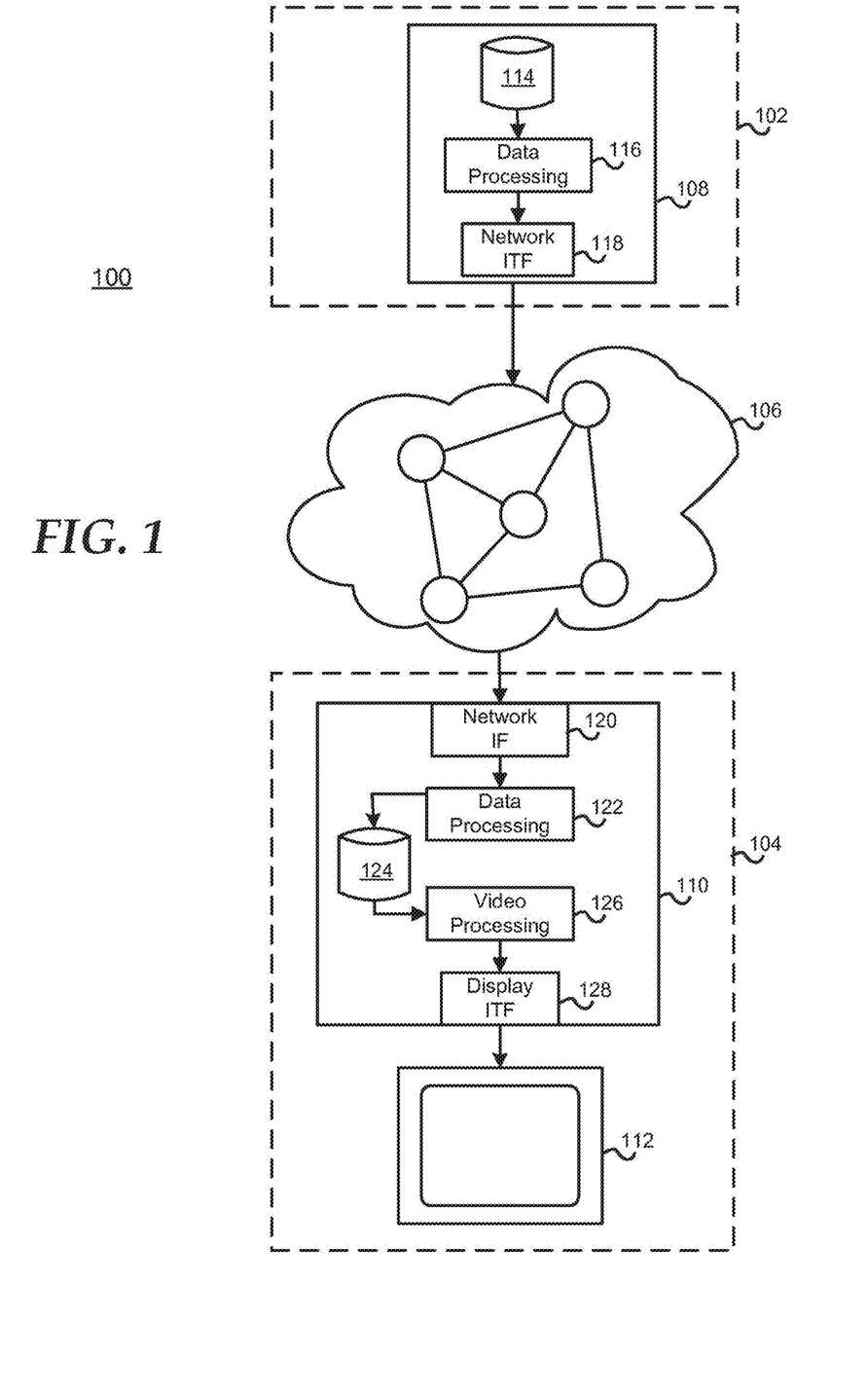
FIG. 1 is a diagram illustrating an example multimedia content distribution system having selective application of a redundancy mechanism on a frame-by-frame basis in accordance with at least one embodiment of the present disclosure.

FIG. 1 illustrates an example multimedia content distribution system 100 utilizing selective application of a redundancy mechanism for transmission of encoded video data based on frame type in accordance with at least one embodiment of the present disclosure. In the depicted example, the multimedia content distribution network 100 includes a service provider 102 and a viewer's premises 104 connected via a network 106. The service provider 102 can include, for example, a cable television provider, a satellite television provider, an Internet-based multimedia content provider, and the like. In the illustrated example, the service provider 102 includes a multimedia content server 108 for transmitting encoded video data to the viewer's premises 104 via the network.

The viewer's premises 104 includes a multimedia receiver 110 and a display device 112. The multimedia receiver 110 can include, for example, a set top box (STB) device, a digital network radio receiver, a portable multimedia device (e.g., a multimedia-enable cellular telephone or a digital radio receiver), and the like. In the context of a relatively fixed multimedia receiver, a viewer's premises can include, for example, a residence or place of work of the viewer, a car, a boat, a plane or other vehicle, and the like. In the context of a portable multimedia receiver, such as a multimedia-enabled cellular phone, a viewer's premises can include the viewer's personal space while operating the multimedia receiver. The display device 112 can include, for example, a television or a monitor.

The network 106 can include any of a variety of digital networks or a combination thereof. Examples of the network 106 can include an Internet-Protocol (IP)-based network, such as the Internet, an Ethernet network, a wireless network (e.g., an IEEE 802.11 alb/gin-compatible network), a satellite network, a Bluetooth™-based network, and the like. The transmission medium of the network 106 for wire-based implementations can include, for example, a coaxial cable-based medium (e.g., a cable television medium), a digital subscriber line (DSL)-based medium (e.g., a plain old telephone system (POTS) medium), a fiber-optic medium, and the like.

The multimedia content server 108, in one embodiment, includes a data store 114 (e.g., a memory, a hard drive, etc.) to store encoded video data representative of one or more multimedia programs, a data processing module 116 to access the data store 114 and to process encoded video data to be transmitted into sets of data segments, and a network interface 118 to provide the resulting data segments as the payloads of corresponding sets of network packets for transmission to the viewer's premises 104 via the network 106. The encoded video data can include, for example, video data encoded in accordance with the MPEG-2 standard or the MPEG-4 standard (also referred to as the H.264 standard).

The multimedia receiver 110, in turn, includes a network interface 120 to receive network packets from the network 106, a data processing module 122 to process the data in the payloads of the received network packets to reassemble the encoded video data, and a data store 124 to store the encoded video data output from the data processing module 122. The multimedia receiver 110 further includes a video processing module 126 to retrieve encoded video data from the data store 124 and decode and process the encoded video data for display on the display device 112 via the display interface 128.

The network interfaces 118 and 120 can include any of a variety of network interfaces suitable for the network 106, such wireless network interfaces, wired Ethernet interfaces, and the like. The display interface 128 includes any of a variety of interfaces to the display device 112, such as a digital video interface (DVI), a high-definition multimedia receiver (HDMI), an S-video interface, a composite video interface (e.g., a coaxial cable interface), a component video interface, and the like. The display interface 128 further can include an audio interface for providing audio signaling to the display device 112.

The data processing modules 116 and 122 can be implemented as software, hardware, firmware, or combinations thereof. For example, in one embodiment one or both of the data processing modules 116 and 122 includes a storage element (e.g., a memory or a hard disk)(not shown) to store a program of instructions and a processor (not shown), whereby the program of instructions is executable by the processor to manipulate the processor so as to perform the techniques described herein with respect to the respective data processing module. As another example, one or both of the data processing modules 116 and 122 alternately can be implemented as a hardware state machine (as part of, or separate from, the corresponding network interface) to implement the techniques described herein.

In operation, a viewer at the viewer's premises 104 initiates the presentation of a multimedia program by inputting a request for the multimedia program (e.g., by selecting a particular channel via a remote control) to the multimedia receiver 110. In response, the multimedia receiver 110 transmits a request for the multimedia program to the service provider 102 via the network 106. At the multimedia content server 108 of the service provider 102, the data processing module 116 accesses the encoded video data representative of the requested multimedia program and prepares the encoded video data for transmission via the network interface 118. Alternately, the video data is stored or received in unencoded form and the data processing module 116 can encode the video data before transmission. As part of preparing the encoded video data for transmission, the data processing module 116 segments the encoded video data into separate data segments and provides the data segments to the network interface 118. The network interface 118 encapsulates each data segment into a separate network packet and provides the resulting network packets for transmission to the multimedia receiver 110 via the network 106, either as a unicast or a multicast transmission.

In one embodiment, the data processing module 116 is configured to apply a redundancy mechanism to the encoded video data so as to permit recovery of encoded video data at the multimedia receiver 110 in the event of packet loss, packet corruption, or excessive transmission latency. However, the application of the redundancy mechanism to the entire encoded video data for a multimedia program would result in a significant, and perhaps prohibitive, increase in the processing bandwidth necessary to implement the redundancy mechanism and in the network bandwidth necessary to transmit the resulting data with redundancy information built in. However, the inventor has realized that the relative impact of a particular frame type on the decoding and presentation process can be used as a guideline for selectively applying a redundancy mechanism to the encoded video data so as to achieve an appropriate balance between reliable video reception and efficient video transmission.

Due to the encoding process, certain frame types may be more necessary for an acceptable decoding and presentation of the represented video content than others. To illustrate, the MPEG standards provide that a sequence of video frames may be encoded into I frames, P frames, and B frames arranged in a particular sequence within a group of pictures (GOP) (e.g., a GOP having the frame sequence I-B-B-B-P-B-B-P), whereby the particular sequence and number of each type of frame in a GOP typically depends on the amount of action or motion between the frame sequence, the presence of any scene changes, and the like. An I frame contains all of the information necessary to generate the corresponding display frame without reference to another frame. A P frame is encoded as a motion compensated difference from an earlier I frame or P frame in the GOP. A B frame is encoded as a motion compensated difference from both an earlier I frame or P frame and a later I frame or P frame in the GOP. Thus, as the decoding of some or all of the P frames and B frames in a GOP depend on an I frame, the corruption of an I frame or the loss of data of an I frame can result in an appreciable negative impact on the decoding of multiple frames in the GOP and therefore can introduce an appreciable visual artifact. Conversely, because B frames typically are not used in decoding other frames, the corruption of a B frame typically affects only one frame of the GOP and any resulting visual artifact therefore may not be noticed by a viewer. Depending on the amount of information (e.g., macroblock information, motion vector information) present in a P frame, the loss or corruption of a P frame mayor may not affect the decoding of multiple frames of a GOP. To illustrate, a P frame is composed of mostly motion vector information (and therefore having a smaller overall data size) likely would have less total impact on the decoding of the GOP compared with a P frame with significant macroblock information (and therefore having a larger overall data size). Thus, the data size of a P frame can serve as a sufficiently accurate representation of the potential impact the P frame has on the decoding and processing of other frames with the same GOP.

Accordingly, in at least one embodiment, the data processing module 116 is configured to selectively employ a redundancy mechanism for the encoded video data on a frame-by-frame basis. For a frame that is likely to have a significant overall impact on the visual presentation in the event of its corruption (e.g., I frames and certain P frames that carry substantial information needed for the decoding of other frames of a GOP), the data processing module 116 uses the redundancy mechanism to distribute the information represented by the frame over a set of data segments, each of which is separately transmitted to the multimedia receiver 110 via the network 106. Thus, up to a certain number of the data segments of the set may be lost or corrupted while still allowing the multimedia receiver 110 to recover the lost or corrupted data due from those data segments that were successfully received to the built-in redundancy. Conversely, for a frame that is less likely to have a significant overall impact in the event of its corruption (e.g., B frames and certain P frames that do not carry much information needed for decoding other frames of a GOP), the data processing module 116 can segment the frame without redundancy, thereby avoiding the generation of extra data to be transmitted and utilizing extra processing bandwidth that otherwise would be necessary if the redundancy mechanism were applied to the frame. This selective application of redundancy-based data recovery on a frame-by-frame basis minimizes the generation of additional data for redundancy purposes and minimizes the processing efforts needed to generate the additional data, while enabling the potential to recover data for those frames more critical to the accurate decoding and presentation of video content.

Any of a variety of redundancy mechanisms can be used to redundantly distribute the data of a frame among a set of data segments. To illustrate, the redundancy mechanism can include a software-based or hardware-based implementation of the Information Dispersal Algorithm (IDA) described by Michael O. Rabin in "Efficient Dispersal of Information for Security, Load Balancing, and Fault Tolerance," *Journal of the Association of Computing Machinery*, Vol. 36, No. 2, April 1989, pp. 335-348, the entirety of which is incorporated by reference herein. As described in the referenced paper, the IDA transforms a file F (the data of a frame in this case) into n pieces (or data segments) via a matrix product of a sequence of vectors to corresponding portions to the file F such that m pieces (m<n) suffice for reconstructing the file F via the inverse of the segmentation operation. The number m of pieces (data segments) necessary to recover the entire file F (data of a frame) can be adjusted as appropriate through manipulation of the algorithm, but with the tradeoff that the total data size of the n generated pieces (data segments) is equal to $(n/m)*IFI$, where IFI represents the total size of the file F (the data of the frame). Thus, as the number m decreases, the total data size of the resulting set of data segments increases, and vice versa. The balance between bandwidth efficiency and data recovery therefore can be set on an implementation-by-implementation basis. Although the IDA is one example of a redundancy mechanism that can be advantageously used, those skilled in the art can use other redundancy mechanisms to distribute data of certain frames redundantly among a set of data segments without departing from the scope of the present disclosure. To illustrate, a forward error correction (FEC)-based technique instead can be used as a redundancy mechanism, as can the broadcast of multiple redundant data streams, whereby a complete data stream can be constructed at the receiving end by switching between the multiple redundant data streams as appropriate using a switch or a router.

At the receiving end, the multimedia receiver 110 receives network packets having the data segments for the frames of the requested video stream. The network interface 120 extracts the data segments and provides them to the data processing module 122. The data processing module 122 reconstructs the frames of the requested multimedia program from the extracted data segments. In the event that one or more data segments for a frame are lost, corrupted, or not timely received, and are not able to be retransmitted in a timely manner, the data processing module 122 determines whether the data segments of the frame were processed at the transmitting end to incorporate redundancy. If not, the data processing module 122 initiates an error-handling process to handle the corrupted frame. This error-handling process can include storing the remaining data as an corrupted frame in the data store 124, filling in the missing data with a default value and storing the resulting frame in the data store 124, or discarding the entire frame. In these situations, the subsequent decoding and processing may introduce a visual artifact in the resulting display frame.

Otherwise, if the data segments were processed to incorporate redundancy, the data processing module 122 uses the received data segments to recover the missing data and stores the resulting frame in the data store 124. Moreover, in at least one embodiment, assembly of the frame from data segments with redundancy information can be initiated once a sufficient number of data segments have been received so as to permit recovery of the data in the other data segments that have yet to be received. Thus, once a minimum number of data segments for a frame has been received, processing of the frame can be initiated without having to wait for the remainder of the data segments to arrive at the receiving end. In the event that too few data segments are available to recover the missing data, an error-handling process may need to be initiated for the corrupted frame. However, in the event that the distribution of data of a frame with redundancy is performed only for those frames that affect the decoding of multiple frames, the inability to fully recover such a frame may introduce a severe visual artifact in the presentation of the video content.

The video processing module 126 accesses frames from the data store 124 in the appropriate decoding sequence and decodes the frames so as to generate a sequence of display frames. In the event that a frame is corrupted, the severity of the impact on the sequence of display frames resulting from its decoding depends on what information was corrupted and on the number and types of other frames that depend on the corrupted frame for their own decoding. The sequence of frames is provided to the display interface 128 for transmission to the display device 112 in analog or digital form.

Figure 2:
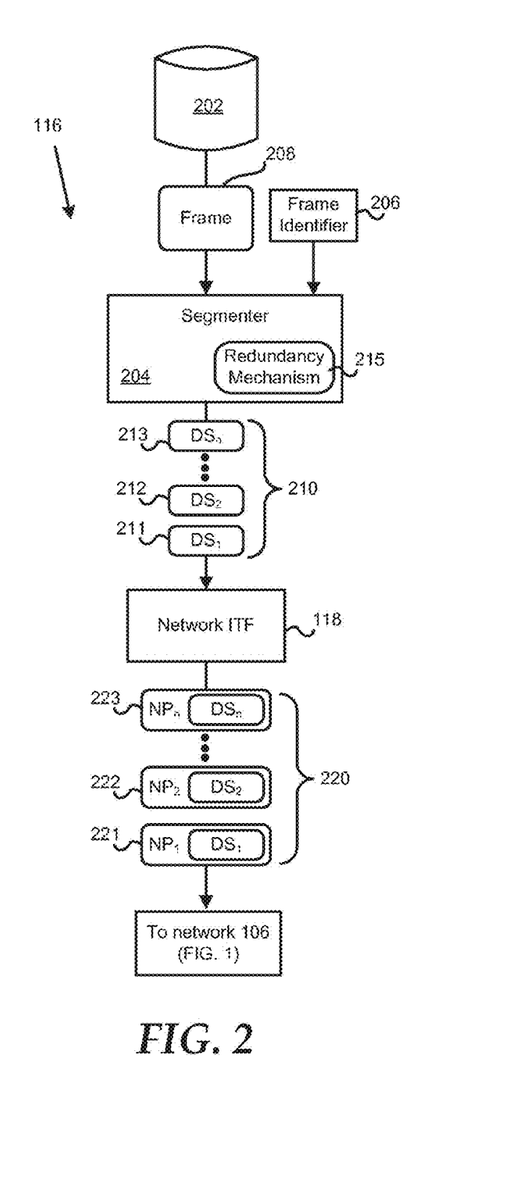
FIG. 2 is a diagram illustrating an example implementation of a multimedia content server of the multimedia content distribution system of FIG. 1 in accordance with at least one embodiment of the present disclosure.

FIG. 2 illustrates an example implementation of the data processing module 116 of the multimedia content server 108 of FIG. 1 in conjunction with the network interface 118 in accordance with at least one embodiment of the present disclosure. In the depicted embodiment, the data processing module 116 includes a buffer 202 (e.g., the data store 114 of FIG. 1 or a different data store), a segmenter module 204, and a frame identifier module 206. The segmenter module 204 and the frame identifier module 206 can be implemented as software, hardware, firmware, or combinations thereof.

In at least one embodiment, the segmenter module 204 is configured to operate on encoded video data being processed for transmission on a frame-by-frame basis. The segmenter module 204 accesses data representative of at least a portion of a frame 208 for processing. Additionally, the frame identifier module 206 determines the frame type (e.g., I frame, P frame, or B frame) and provides an indicator of the frame type of the frame 208 to the segmenter module 204. Many video encoding protocols provide that the frame type is provided in the header information for the data representative of the frame, and the frame identifier module 206 can access this header information to identify the frame type. Further, in at least one embodiment, the frame identifier module 206 can identify certain characteristics regarding the frame 208 that may be useful in determining the degree to which the frame 208 impacts the decoding of other frames. As described in greater detail herein, one such characteristic can include the total data size of the frame 208 in the event that it is a P frame.

The segmenter module 204 uses the frame type and, in certain instances, characteristics regarding the frame 208 to segment the data of the frame 208 into a set 210 of data segments $DS_1, DS_2, \ldots, DS_n$ (illustrated as data segments 211-213). In one embodiment, the segmenter module 204 selectively applies a redundancy mechanism 215 when segmenting the data of the frame 208 based on the frame type so as to facilitate data recovery at the receiving end for certain frame types. To illustrate, if the frame type and frame characteristics provided by the frame identifier module 206 indicate that the frame 208 is an I frame or a P frame having a data size greater than a certain threshold, the segmenter module 204 applies the redundancy mechanism 215 in segmenting the data of the frame 208 such that the information represented by the frame is redundantly distributed among the set 210 of data segments such that a subset of at least a certain number of the set 210 can be used to recover data lost by the loss, corruption, or excessive delay of other data segments of the set 210. Moreover, the redundant distribution of information throughout the set 210 of data segments permits the receiving end to reconstruct the frame once a sufficient subset of data segments has been received without having to wait for receipt of all of the data segments. Conversely, if the frame type and frame characteristics indicate the frame 208 is a B frame or a P frame having a data size less than the threshold, the segmenter module 204 forgoes application of the redundancy mechanism 215. In another embodiment, all P frames can be treated the same as I frames (i.e., with application of the redundancy mechanism 215). Alternately, all P frames can be treated the same as B frames (i.e., without application of the redundancy mechanism).

It will be appreciated that the redundant distribution of data of the frame 208 among the set 210 typically increases the overall data size of the set 210 such that the total data size of the set 210 is greater than the total data size of the frame 208, whereas the segmentation of the frame 208 without redundancy will result in the set 210 having a total data size approximately equal to the total data size of the frame 208. Thus, by selectively applying the redundancy mechanism 215 such that only those frames having an appreciable impact on the decoding of other frames (and thus an appreciable impact on viewing quality), an appropriate balance can be achieved between processing and transmission efficiency and reliable transmission of video content.

The network interface 118 receives the data segments of the set 210 and packetizes each data segment into a different network packet of a corresponding set 220 of network packets $NP_1, NP_2, \ldots, NP_n$ (illustrated as network packets 221-223). Any of a variety of packet formats can be implemented based on the protocol of the network 106 (FIG. 1). To illustrate, the network 106 may support the Real-Time Transport Protocol (RTP), which provides end-to-end network transport functions for applications transmitting real-time data, such as audio and video data, over multicast or unicast network services. In this case, the network packets of the set 220 can comprise RTP formatted packets (which in turn encapsulate UDP packets).

The network interface 118 provides the set 220 of network packets to the network 106 for transmission to the multimedia receiver 110 as part of a unicast or multicast transmission. In certain instances, one or more of the network packets of the set 220 may be lost, corrupted, or excessively delayed as they navigate the nodes of the network 106. In instances where the data segments of the frame 208 are generated without redundancy, the loss, corruption, or excessive delay of one of the network packets typically will result in an unrecoverable error in reforming the frame 208 at the receiving end. However, because the recovery mechanism 215 is not applied for those frames of less consequence in the decoding and presentation of the video content, this error may not cause appreciable degradation in the presentation of the video content. However, in instances where the data segments of the frame 208 are generated with redundancy, the receiving end typically would be able to recover lost data using the redundancy built into the remaining data segments that were received at the receiving end.

Figure 3:
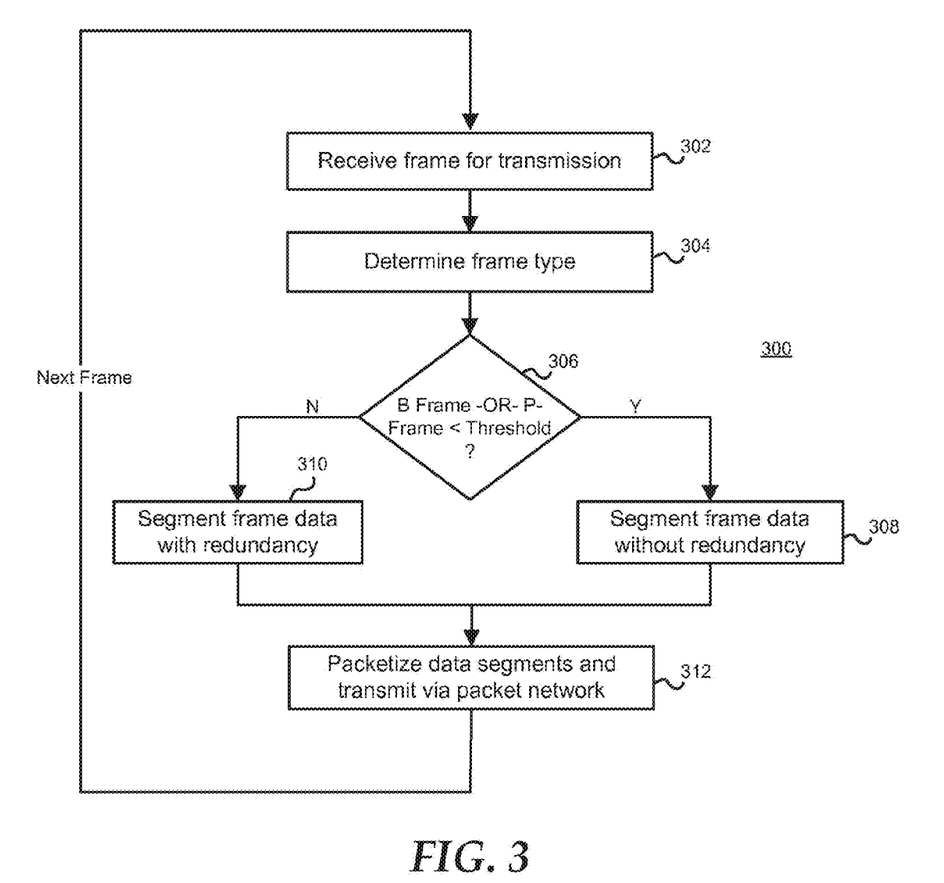
FIG. 3 is a flow diagram illustrating an example method for selectively employing a redundancy mechanism for video content transmission based on frame type in accordance with at least one embodiment of the present disclosure.

FIG. 3 illustrates an example method 300 of operation of the implementation of the FIG. 2 in accordance with at least one embodiment of the present disclosure. At block 302, the segmenter module 204 accesses a frame (e.g., frame 208) of encoded video data for processing. At block 304, the frame identifier module 206 identifies the frame type and certain characteristics of the frame (e.g., data size). At block 306, the segmenter module 204 determines whether the frame is a B frame or a P frame having a data size less than a threshold size (i.e., thereby indicating the relative impact the P frame has on decoding other frames in its GOP). If so, at block 308 the segmenter module 204 segments the data of the frame into a set of data segments (e.g., set 210) without applying the redundancy mechanism 215 to the data of the frame. Otherwise, if the frame is an I frame or a P frame having a data size greater than the threshold size, at block 310 the segmenter module 204 segments the data of the frame into a set of data segments with application of the redundancy mechanism 215 so as to redundantly distribute the data of the frame among the resulting data segments. At block 312, the network interface 118 packetizes each data segment of the set into a separate network packet and provides the network packet to the network 106 (FIG. 1) for transmission one or more viewer's premises. The process of method 300 then can repeat for the next frame of the encoded video data being transmitted.

Figure 4:
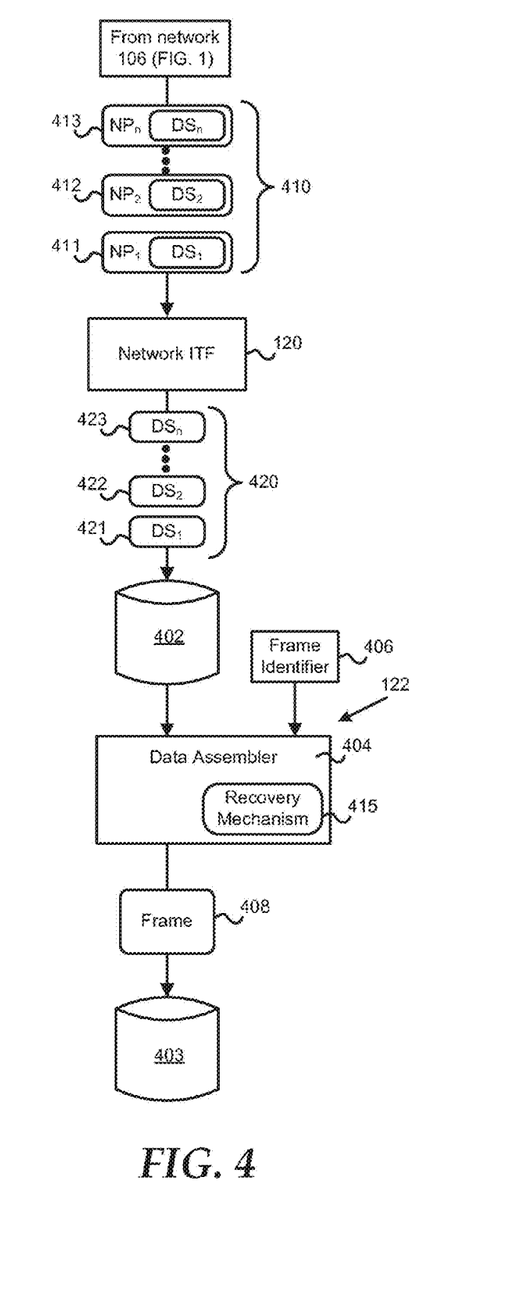
FIG. 4 is a diagram illustrating an example implementation of a multimedia receiver of the multimedia content distribution system in accordance with at least one embodiment of the present disclosure.

FIG. 4 illustrates an example implementation of the data processing module 122 of the multimedia receiver 110 of FIG. 1 in conjunction with the network interface 120 in accordance with at least one embodiment of the present disclosure. In the depicted embodiment, the data processing module 122 includes a buffer 402, a buffer 403 (e.g., the data store 124, FIG. 1), an assembler module 404, and a frame identifier module 406. The assembler module 404 and the frame identifier module 406 can be implemented as software, hardware, firmware, or combinations thereof.

In operation, the network interface 120 receives a set 410 of network packets NP 1, NP2, . . . , NPn (illustrated as network packets 411-413), each having a data segment representative of information of a frame 408 of encoded video data. The set 410 corresponds to, for example, the set 220 of network packets of FIG. 2, with the exception that one or more network packets may have been lost, corrupted, or excessively delayed during their transmission via the network 106. Alternately, the set 410 can represent a subset of data segments with redundant information that is sufficient to reconstruct the entire frame using the redundant information without having to wait for receipt of the remaining data segments. The network interface 120 extracts the data segments of the received network packets to generate a set 420 of data segments DS1, DS2, . . . , DSn (illustrated as data segments 421-423) representative of the frame 408. The set 420 is stored in the buffer 402.

Due to packet loss, corruption or delay, or due to the desire to expedite processing of the frame, the set 420 may represent only a subset of the set 210 (FIG. 2) of data segments generated from the corresponding frame. Accordingly, when accessing the set 420 from the buffer 402 to generate the corresponding frame 408, frame identifier module 406 determines the frame type and, in certain instances, characteristics of the frame (e.g., total data size) and provides indicators of the frame type and frame characteristics to the assembler module 404. The assembler module 404 uses the frame type and frame characteristics to determine how to process the set 420. To illustrate, if the frame represented by the set 420 is an I frame, the assembler module 404 can recognize that the redundancy mechanism 215 was applied to the data of the I frame in generating the corresponding set of data segments and thus the assembler module 404 uses a recovery mechanism 415 to generate the data of the frame 408 from the set 420 of data segments (where the recovery mechanism reverses the redundant distribution of data among the set of data segments performed by application of the recovery mechanism 215 of FIG. 2). In the event of data loss (i.e., the set 420 is not the complete set of data segments), the assembler module 404 can use the recovery mechanism 415 to recover the lost data using the built-in redundancy in the remaining data segments. Otherwise, if all data is present, the assembler module 404 uses the recovery mechanism 415 to extract the data of the frame 408 from the data of the set 420 of data segments and provide the data of the frame 408 to the buffer 403 for storage until it is accessed by the video processing module 126 (FIG. 1) for decoding.

Otherwise, if the frame type of the frame 408 is identified as a B frame or a P frame having a data size less than the threshold, the assembler module 404 can assume that the redundancy mechanism 215 was not applied in generation of the data segments and thus the data of the set 410 of the data segments does not need processing so as to reverse the distribution of redundant information throughout the set of data segments. However, in the event of data loss during transmission, the assembler module 404 may not be able to recover the lost data and thus the data of the frame 408 may be incomplete. The data of the frame 408 is provided to the buffer 403 for storage until it is accessed for decoding.

Figure 5:
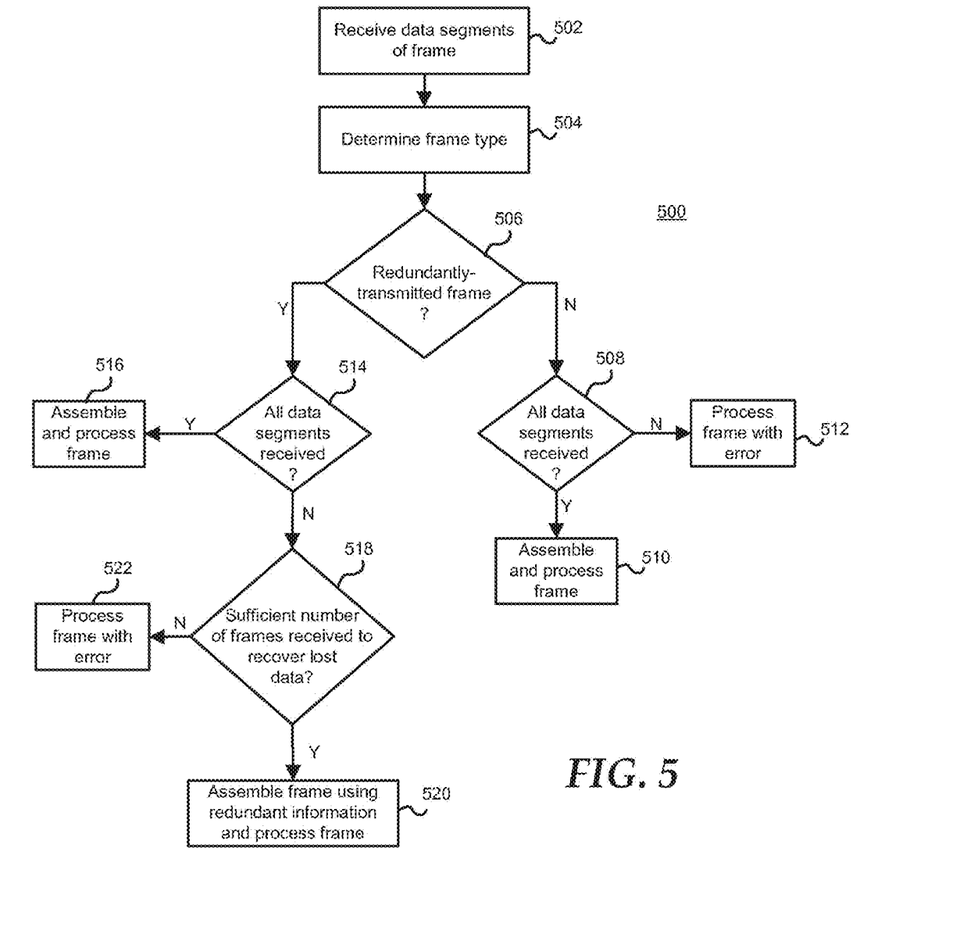
FIG. 5 is a flow diagram illustrating an example method for receiving and processing video content with selective redundancy based on frame type in accordance with at least one embodiment of the present disclosure.

FIG. 5 illustrates an example method 500 of operation of the implementation of FIG. 4 in accordance with at least one embodiment of the present disclosure. At block 502, the network interface 120 receives a set of network packets (e.g., set 410) representative of a frame of encoded video data. The network interface 120 extracts the data segments in the payloads of the network packets to generate a set of data segments (e.g., set 420) representative of the data of the frame. Due to transmission errors, the set of data segments may not represent the entire set of data segments.

At block 504, the frame identifier module 406 identifies the frame type of the frame and provides an indicator of the frame type and an indicator of one or more characteristics of the frame to the assembler module 404. From these indicators, at block 506 the assembler module 404 determines whether a redundancy mechanism (e.g., redundancy mechanism 215, FIG. 2) was applied in the generation of the data segments. To illustrate, if the frame is an I frame or a P frame of at least a threshold size, the assembler module 404 may determine that the redundancy mechanism was applied, whereas if the frame is a B frame or a P frame less than the threshold size, the assembler module may determine that redundancy was not implemented in the data segments.

If the data segments were not generated with redundancy, at block 508 the assembler module 404 determines whether the set of received data segments represents the entire set of data segments representative of the frame (i.e., all data segments for the frame have been received and are not corrupted). If so, at block 510 the assembler module 404 assembles the frame from the data segments and provides the resulting data for further processing (e.g., decoding and display). Otherwise, if some data is missing or corrupted, at block 512 the assembler module 404 processes the data in an error context. This processing can include attempting to fill in the missing data with default data values, dropping the frame, or providing the frame with missing data for processing, each of which may result in the introduction of a minor visual artifact.

If the assembler module 404 determines at block 506 that redundancy was built into the data segments of the received set (e.g., the frame was an I frame or a P of at least a threshold size), at block 514 the assembler module 404 determines whether all of the data segments were received and are not corrupted. If so, at block 516 the assembler module 404 extracts the data of the frame from the set of data segments and provides the resulting data for further processing. Otherwise, if there is lost data the assembler module 404 determines whether a sufficient proportion or number of data segments have been received to recover the missing data at block 518, where the necessary number or proportion depends on how the data of the frame was redundantly distributed among the original set of data segments. In the event that there is a sufficient number of data segments to recover the missing data, at block 520 the assembler module 404 utilizes the built-in redundancy in the received data segments to recover the lost data and extracts the data of the frame from the received data segments. The data of the frame then can be provided for further processing. Otherwise, if the number of received data segments is insufficient to recover the lost data, at block 522 the assembler module 404 processes the frame with error. This processing can include filling in the missing data with default values, assembling the frame as-is with the missing data, or dropping the frame. However, as the frame is an I frame or a P frame likely to be used for the decoding of multiple frames, the error in the resulting frame can have an appreciable impact on the decoding and presentation of the corresponding display frames.

Figure 6:
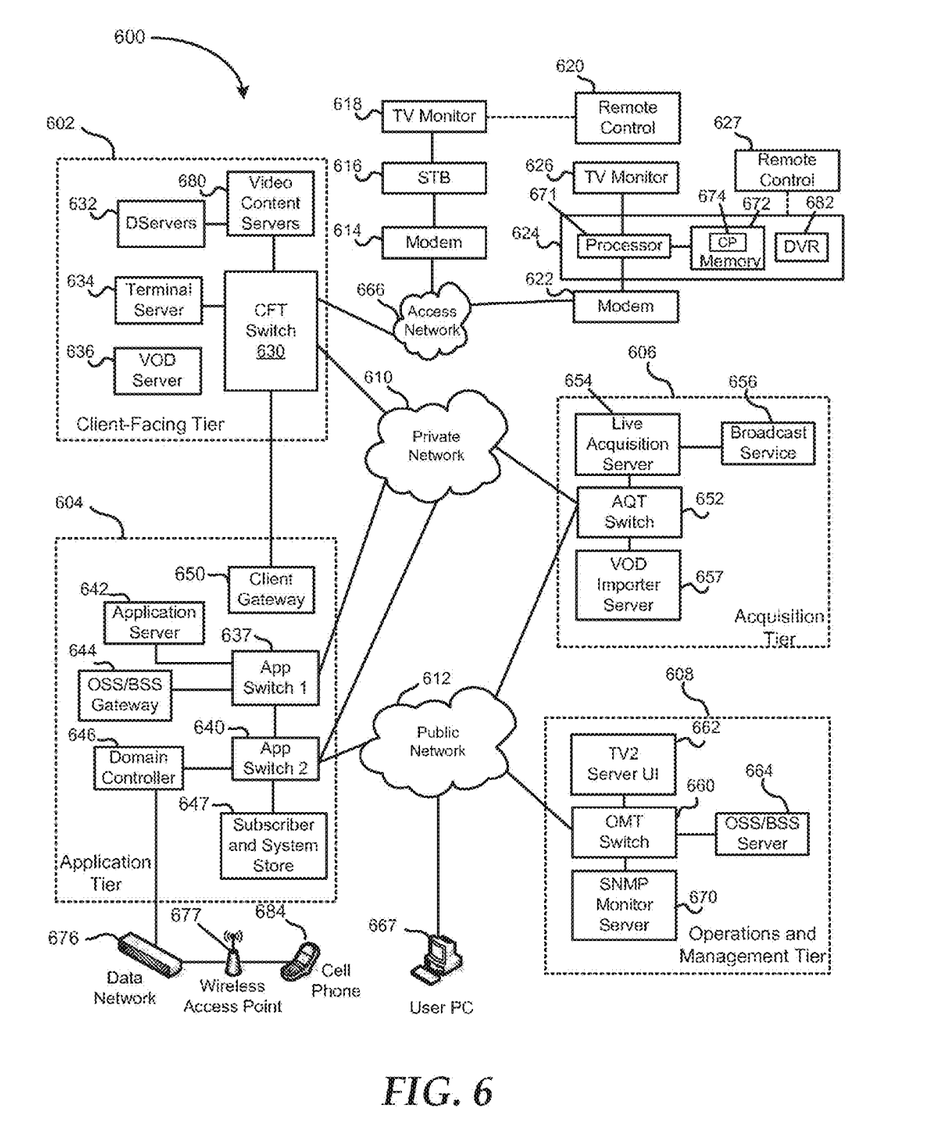
FIG. 6 is a block diagram illustrating an example Internet Protocol Television (IPTV) network in which the multimedia content distribution system of FIG. 1 can be implemented in accordance with at least one embodiment of the present disclosure.

FIG. 6 illustrates an example Internet Protocol Television (IPTV) system 600 in which the disclosed video monitoring techniques can be implemented in accordance with at least one embodiment of the present disclosure. The IPTV system 600 can include a client facing tier 602, an application tier 604, an acquisition tier 606, and an operations and management tier 608. Each tier 602, 604, 606, and 608 is coupled to a private network 610, a public network 612, or both the private network 610 and the public network 612. For example, the client-facing tier 602 can be coupled to the private network 610. Further, the application tier 604 can be coupled to the private network 610 and to the public network 612, such as the Internet. The acquisition tier 606 can also be coupled to the private network 610 and to the public network 612. Moreover, the operations and management tier 608 can be coupled to the public network 612.

The various tiers 602, 604, 606, and 608 communicate with each other via the private network 610 and the public network 612. For instance, the client-facing tier 602 can communicate with the application tier 604 and the acquisition tier 606 via the private network 610. The application tier 604 can also communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604 can communicate directly with the client-facing tier 602.

The client-facing tier 602 can communicate with user equipment via a private access network 666, such as an Internet Protocol Television (IPTV) network. In an illustrative embodiment, modems, such as a first modem 614 and a second modem 622 can be coupled to the private access network 666. The client-facing tier 602 can communicate with a first representative STB device 616 via the first modem 614 and with a second representative STB device 624 via the second modem 622. The client-facing tier 602 can communicate with a large number of set-top boxes, such as the representative set-top boxes 616 and 624, over a wide geographic area, such as a regional area, a metropolitan area, a viewing area, or any other suitable geographic area that can be supported by networking the client-facing tier 602 to numerous set-top box devices. In an illustrative embodiment, the client facing tier or any portion thereof can be included at a video head-end office.

In one embodiment, the client-facing tier 602 can be coupled to the modems 614 and 622 via fiber optic cables. Alternatively, the modems 614 and 622 can be digital subscriber line (DSL) modems that are coupled to one or more network nodes via twisted pairs, and the client-facing tier 602 can be coupled to the network nodes via fiber-optic cables. Each set-top box device 616 and 624 can process data received through the private access network 666 via an IPTV software platform such as Microsoft® TV IPTV Edition.

Additionally, the first set-top box device 616 can be coupled to a first display device 618, such as a first television monitor, and the second set-top box device 624 can be coupled to a second display device 626, such as a second television monitor. Moreover, the first set-top box device 616 can communicate with a first remote control 620, and the second set-top box device can communicate with a second remote control 627. In an exemplary, non-limiting embodiment, each set-top box device 616 and 624 can receive data or video from the client-facing tier 602 via the private access network 666 and render or display the data or video at the display devices 618 and 626 to which it is coupled. In an illustrative embodiment, the set-top box devices 616 and 624 can include tuners that receive and decode television programming information for transmission to the display devices 618 and 626. The television tuner can be National Television System Committee (NTSC) tuner, an Advanced Television System Committee (ATSC), another suitable analog or digital tuner, or any combination thereof A signal for a television channel can pass through the tuner before the content is displayed on a monitor.

In an exemplary, non-limiting embodiment, STB devices 616 and 624 can receive a data stream including video content data and audio content data from the client-facing tier 602 via the private access network 666. The STB device 616 and 624 can transmit the video content to an external display device, such as the television monitors 618 and 626. The STB devices 616 and 624 can also communicate commands received from the remote control devices 620 and 628 to the client-facing tier 602 via the private access network 666.

In an illustrative embodiment, the client-facing tier 602 can include a client-facing tier (eFT) switch 630 that manages communication between the client-facing tier 602 and the private access network 666 and between the client-facing tier 602 and the private network 610. As shown, the eFT switch 630 is coupled to one or more data servers 632 that store data transmitted in response to viewer requests, such as video-on-demand material. The eFT switch 630 can also be coupled to a terminal server 634 that provides terminal devices, such as a game application server 667 and other devices with a common connection point to the private network 610. In a particular embodiment, the eFT switch 630 can also be coupled to a video-on-demand (VOD) server 636 that stores or provides VOD content imported by the IPTV system 600. The client-facing tier 602 can also include one or more channel provision servers 680 that transmit video content requested by viewers via their STB devices 616 and 624. In an illustrative, non-limiting embodiment, the channel provision servers 680 can include one or more of the video content server 108 of FIG. 1.

As shown in FIG. 6, the application tier 604 can communicate with both the private network 610 and the public network 612. In this embodiment, the application tier 604 can include a first application tier (APP) switch 637 and a second APP switch 640. In a particular embodiment, the first APP switch 637 can be coupled to the second APP switch 640. The first APP switch 637 can be coupled to an application server 642 and to an OSS/BSS gateway 644. The application server 642 provides applications to the settop box devices 616 and 624 via the private access network 666, so the set-top box devices 616 and 624 can provide functions, such as display, messaging, processing of IPTV data and VOD material, etc. In a particular embodiment, the OSS/BSS gateway 644 includes operation systems and support (OSS) data, as well as billing systems and support (BSS) data.

Further, the second APP switch 640 can be coupled to a domain controller 646 that provides web access, for example, to users via the public network 612. The second APP switch 640 can be coupled to a subscriber and system store 647 that includes account information, such as account information that is associated with users who access the system 600 via the private network 610 or the public network 612. In a particular embodiment, the application tier 604 can also include a client gateway 650 that communicates data directly to the client-facing tier 602. In this embodiment, the client gateway 650 can be coupled directly to the eFT switch 630. The client gateway 650 can provide user access to the private network 610 and the tiers coupled thereto.

In a particular embodiment, the set-top box devices 616 and 624 can access the system via the private access network 666, using information received from the client gateway 650. The private access network 666 provides security for the private network 610. User devices can access the client gateway 650 via the private access network 666, and the client gateway 650 can allow such devices to access the private network 610 once the devices are authenticated or verified. Similarly, the client gateway 650 can prevent unauthorized devices, such as hacker computers or stolen set-top box devices from accessing the private network 610, by denying access to these devices beyond the private access network 666.

For example, when a set-top box device 616 accesses the system 600 via the private access network 666, the client gateway 650 can verify subscriber information by communicating with the subscriber and system store 647 via the private network 610, the first APP switch 637 and the second APP switch 640. Further, the client gateway 650 can verify billing information and status by communicating with the OSS/BSS gateway 644 via the private network 610 and the first APP switch 637. The OSS/BSS gateway 644 can transmit a query across the first APP switch 637 to the second APP switch 640, and the second APP switch 640 can communicate the query across the public network 612 to an OSS/BSS server 664. After the client gateway 650 confirms billing information, the client gateway 650 can allow the set-top box device 616 access to IPTV content and VOD content. If the client gateway 650 cannot verify subscriber information for the set-top box device 616, for example because it is connected to a different twisted pair, the client gateway 650 can deny transmissions to and from the settop box device 616 beyond the private access network 666.

The acquisition tier 606 includes an acquisition tier (AQT) switch 652 that communicates with the private network 610. The AQT switch 652 can also communicate with the operations and management tier 608 via the public network 612. In a particular embodiment during operation of the IPTV system, the live acquisition server 654 can acquire television or movie content. The live acquisition server 654 can transmit the television or movie content to the AQT switch 652, and the AQT switch can transmit the television or movie content to the CFT switch 630 via the private network 610.

Further, the television or movie content can be transmitted to the channel provision servers 680, where it can be encoded, formatted, stored, or otherwise manipulated and prepared for communication to the STB devices 616 and 624. The CFT switch 630 can communicate the television or movie content to the modems 614 and 622 via the private access network 666. The STB devices 616 and 624 can receive the television or movie content via the modems 614 and 622, and can transmit the television or movie content to the television monitors 618 and 626. In an illustrative embodiment, video or audio portions of the television or movie content can be streamed to the STB devices 616 and 624.

Further, the AQT switch can be coupled to a VOD importer server 657 that stores television or movie content received at the acquisition tier 606 and communicates the stored content to the VOD server 636 at the client-facing tier 602 via the private network 610. Additionally, at the acquisition tier 606, the VOD importer server 657 can receive content from one or more VOD sources outside the IPTV system 600, such as movie studios and programmers of non-live content. The VOD importer server 657 can transmit the VOD content to the AQT switch 652, and the AQT switch 652, in turn, can communicate the material to the eFT switch 630 via the private network 610. The VOD content can be stored at one or more servers, such as the VOD server 636.

When users issue requests for VOD content via the STB devices 616 and 624, the requests can be transmitted over the private access network 666 to the VOD server 636 via the eFT switch 630. Upon receiving such requests, the VOD server 636 can retrieve the requested VOD content and transmit the content to the STB devices 616 and 624 across the private access network 666 via the eFT switch 630. The STB devices 616 and 624 can transmit the VOD content to the television monitors 618 and 626. In an illustrative embodiment, video or audio portions of VOD content can be streamed to the STB devices 616 and 624.

The operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to the OSS/BSS server 664 and to a simple network management protocol (SNMP) monitor 667 that monitors network devices within or coupled to the IPTV system 600. In a particular embodiment, the OMT switch 660 can communicate with the AQT switch 652 via the public network 612.

In a particular embodiment during operation of the IPTV system, the live acquisition server 654 can acquire television content from the broadcast service 656. The live acquisition server 654 can transmit the television or movie content to the AQT switch 652, and the AQT switch 652 in turn can transmit the television content to the eFT switch 630 via the private network 610 or to the OMT switch 660 via the public network 612. Further, the television content can be encoded at the D-servers 632, and the eFT switch 630 can communicate the television content to the modems 614 and, 622 via the private access network 666. The set-top box devices 616 and 624 can receive the television content from the modems 614 and 622, decode the television content, and transmit the content to the display devices 618 and 626 according to commands from the remote control devices 620 and 628.

Additionally, at the acquisition tier 606, the video-on-demand (VOD) importer server 657 can receive content from one or more VOD sources outside the IPTV system 600, such as movie studios and programmers of non-live content. The VOD importer server 657 can transmit the VOD content to the AQT switch 652, and the AQT switch 652 in turn can communicate the material to the CFT switch 630 via the private network 610. The VOD content can be stored at one or more servers, such as the VOD server 636.

When a user issues a request for VOD content to set-top box devices 616 and 624, the request can be transmitted over the private access network 666 to the VOD server 636 via the CFT switch 630. Upon receiving such a request, the VOD server 636 can retrieve requested VOD content and transmit the content to the set-top box devices 616 and 624 across the private access network 666 via the CFT switch 630. In an illustrative embodiment, the live acquisition server 654 can transmit the television content to the AQT switch 652, and the AQT switch 652 in turn can transmit the television content to the OMT switch 660 via the public network 612. In this embodiment, the OMT switch 660 can transmit the television content to the TV2 server 662 for display to users accessing the user interface at the TV2 server. For example, a user can access the TV2 server 662 using a personal computer 670 coupled to the public network 612.

The domain controller 646 communicates with the public network 612 via the second APP switch 640. Additionally, the domain controller 646 can communicate via the public network 612 with the personal computer 667. For example, the domain controller 646 can display a web portal via the public network 612 and allow users to access the web portal using the PC 667. Further, in an illustrative embodiment, the domain controller 646 can communicate with at least one wireless network access point 677 over a data network 676. In this embodiment, each wireless network access device 677 can communicate with user wireless devices, such as a cellular telephone 684.

In a particular embodiment, a set-top box device such as the second set-top box device 624 can include an STB processor 671 and an STB memory device 672 that is accessible to the STB processor 671. The set-top box device 624 also includes a STB computer program 674 that is embedded within the STB memory device 672. In a particular embodiment, the STB computer program 674 can contain instructions to receive and execute at least one user television viewing preference that a user has entered by accessing an Internet user account via the domain controller 646. For example, the user can use the PC 667 to access a web portal maintained by the domain controller 646 via the Internet. The domain controller 646 can query the subscriber and system store 647 via the private network 610 for account information associated with the user. In a particular embodiment, the account information can associate the user's Internet account with the second set-top box device 624. For instance, in an illustrative embodiment, the account information can relate the user's account to the second set-top box device 624, by associating the user account with an IP address of the second set-top box device with data relating to one or more twisted pairs connected with the second set-top box device 624, with data related to one or more fiber optic cables connected with the second set-top box device 624, with an alphanumeric identifier of the second set-top box device 624, with any other data that is suitable for associating second set-top box device 624 with a user account, or with any combination of these.

The STB computer program 674 can contain instructions to receive many types of user preferences from the domain controller 646 via the access network 666. For example, the STB computer program 674 can include instructions to receive a request to record at least one television program at a video content storage module such as a digital video recorder (DVR) 682 within the second set-top box device 624. In this example embodiment, the STB computer program 674 can include instructions to transmit the request to the DVR 682, where the television program(s) are recorded. In an illustrative embodiment, the STB computer program 674 can include instructions to receive from the DVR 682 a recording status with respect to one or more of the television programs and to transmit at least one message regarding the status to a wireless device, such as the cellular telephone 684. The message can be received at the CFT switch 630, for instance, and communicated to the domain controller 646 across the private network 610 via the second APP switch 640. Further, the domain controller 646 can transmit the message to the wireless data network 676, directly or via the public network 612, and on to the wireless network access point 677. The message can then be transmitted to the cellular telephone 684. In an illustrative embodiment, the status can be sent via a wireless access protocol (WAP).

Figure 7:
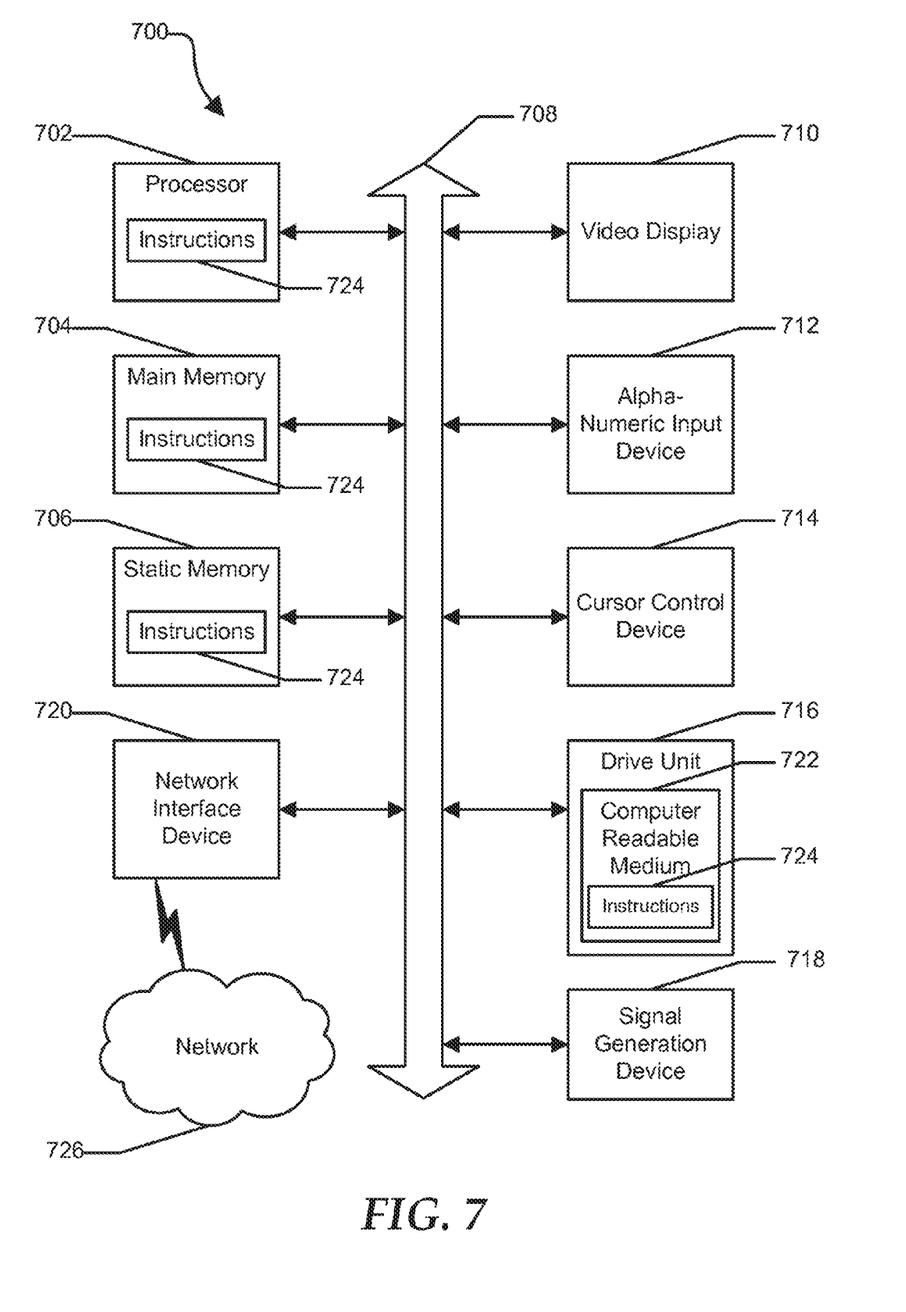
FIG. 7 is a diagram illustrating an example computer system for implementing one or more of the techniques described herein in accordance with at least one embodiment of the present disclosure.

FIG. 7 shows an illustrative embodiment of a general computer system 700 in accordance with at least one embodiment of the present disclosure. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into, for example, a STB device. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include anyone or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

What is claimed is:

1. A method comprising:
receiving, by a system including a processor, encoded video data comprising a plurality of data frames;
for each predictive coded frame (P frame) of the plurality of data frames having an original data size greater than a threshold size:
generating a first plurality of data segments from data representative of the P frame such that a first data size of the first plurality of data segments is sufficient to create redundancy in the first plurality of data segments to enable a multimedia receiver to reconstruct the P frame after a corruption of a subset of the first plurality of data segments; and
for each P frame of the plurality of frames for which the original data size is less than the threshold size:
generating a second plurality of data segments from data representative of the P frame, wherein an entirety of the data representative of the P frame is unrecoverable after a corruption of a subset of the second plurality of data segments.

2. The method of claim 1, further comprising separately transmitting, by the system, each of the first plurality of data segments in a corresponding network packet for receipt by the multimedia receiver.

3. The method of claim 1, further comprising transmitting, by the system, the second plurality of data segments in one or more network packets for receipt by the multimedia receiver.

4. The method of claim 1, wherein generating the first plurality of data segments from data representative of the P frame comprises generating the first plurality of data segments using an Information Dispersal Algorithm (IDA) for the data representative of the P frame.

5. The method of claim 1, further comprising generating by the system, for each intra coded frame (I frame) of the plurality of frames, a third plurality of data segments from data representative of the I frame such that a second data size of the third plurality of data segments is sufficient to create redundancy in the third plurality of data segments to enable the multimedia receiver to reconstruct the I frame after a corruption of a subset of the third plurality of data segments.

6. The method of claim 5, further comprising separately transmitting, by the system, each of the third plurality of data segments in a corresponding network packet for receipt by the multimedia receiver.

7. The method of claim 1, further comprising generating by the system, for each bi-directional coded frame (B frame) of the plurality of data frames, a fourth plurality of data segments from data representative of the B frame, wherein an entirety of the data representative of the B frame is unrecoverable after a corruption of a subset of the fourth plurality of data segments.

8. The method of claim 7, further comprising transmitting, by the system, the fourth plurality of data segments in one or more network packets for receipt by the multimedia receiver.

9. A device, comprising:
a memory storing encoded video data comprising a plurality of data frames;
a processor coupled to the memory, wherein the memory further comprises computer instructions that when executed by the processor cause the processor to perform operations comprising:
generating, for each predictive coded frame (P frame) of the plurality of data frames having an original data size greater than a threshold size, a first plurality of data segments from data representative of the P frame such that a first data size of the first plurality of data segments is sufficient to create redundancy in the first plurality of data segments to enable a multimedia receiver to reconstruct the P frame after corruption of a subset of the first plurality of data segments; and
generating, for each P frame of the plurality of data frames for which the original data size is less than the threshold size, a second plurality of data segments from data representative of the P frame, wherein an entirety of the data representative of the P frame is unrecoverable after a corruption of a subset of the second plurality of data segments.

10. The device of claim 9, wherein the processor, responsive to executing the computer instructions, performs operations further comprising, transmitting separately each of the first plurality of data segments in a corresponding network packet for receipt by the multimedia receiver; and transmitting the second plurality of data segments in one or more network packets for receipt by the multimedia receiver.

11. The device of claim 9, wherein the processor, responsive to executing the computer instructions, performs operations comprising for each intra coded frame (I frame) of the plurality of frames:

generating a third plurality of data segments from data representative of the I frame such that a second data size of the third plurality of data segments is sufficient to create redundancy in the third plurality of data segments to enable the multimedia receiver to reconstruct the I frame after a corruption of a subset of the third plurality of data segments; and separately transmitting each of the third plurality of data segments in a corresponding network packet for receipt by the multimedia receiver.

12. The device of claim 9, wherein the processor, responsive to executing the computer instructions, performs operations comprising for each bi-directional coded frame (B frame) of the plurality of frames:

generating a fourth plurality of data segments from data representative of the B frame, an entirety of the data representative of the B frame being unrecoverable after a corruption of a subset of the fourth plurality of data segments; and transmitting the fourth plurality of data segments in one or more network packets for receipt by the multimedia receiver.

13. The device of claim 9, wherein generating the first plurality of data segments from data representative of the P frame comprises generating the first plurality of data segments using an Information Dispersal Algorithm (IDA) for the data representative of the P frame.

14. The device of claim 9, further comprising, in communication with the processor, a redundancy mechanism redundantly distributing data representative of the data frame throughout the respective plurality of data segments, each resulting plurality of data segments having a total size greater than the a total size of the respective data representative of the data frame.

15. A non-transitory, computer readable storage medium, comprising computer instructions which, responsive to being executed by a processor, cause the processor to perform operations comprising:

providing a first plurality of data segments in one or more network packets to the network for transmission to a multimedia receiver;

for each predictive coded frame (P frame) of a plurality of data frames having an original data size greater than a threshold size:

generating a first plurality of data segments from data representative of the P frame such that a first data size of the first plurality of data segments is sufficient to create redundancy in the first plurality of data segments to enable the multimedia receiver to reconstruct the P frame after a corruption of a subset of the first plurality of data segments; and providing each of the first plurality of data segments in a separate corresponding network packet to the network for transmission to the multimedia receiver; and for each P frame of the plurality of frames for which the original data size is less than the threshold size:

generating a second plurality of data segments from data representative of the P frame, wherein an entirety of the data representative of the P frame is unrecoverable after a corruption of a subset of the second plurality of data segments; and providing the second plurality of data segments in one or more network packets to the network for transmission to the multimedia receiver.

16. The non-transitory, computer readable storage medium of claim 15, wherein separately transmitting each of the first plurality of data segments in a corresponding network packet for receipt by the multimedia receiver comprises using a network interface.

17. The non-transitory, computer readable storage medium of claim 15, comprising computer instructions which when executed by the processor cause the processor to perform operations comprising for each intra coded frame (I frame) of a plurality of data frames of an encoded video data:

generating a first plurality of data segments from data representative of the I frame such that a second data size of the first plurality of data segments is sufficient to create redundancy in the first plurality of data segments to enable the multimedia receiver to reconstruct the I frame after corruption of a subset of the first plurality of data segments; and providing each of the first plurality of data segments in a separate corresponding network packet to a network for transmission to the multimedia receiver.

18. The non-transitory, computer readable storage medium of claim 15, comprising computer instructions which when executed by the processor cause the processor to perform operations comprising for each bi-directional coded frame (B frame) of the plurality of data frames:

generating a second plurality of data segments from data representative of the B frame, wherein an entirety of the data representative of the B frame is unrecoverable after a corruption of a subset of the second plurality of data segments; and providing the second plurality of data segments in one or more network packets to the network for transmission to the multimedia receiver.

19. The non-transitory, computer readable storage medium of claim 15, wherein generating the first plurality of data segments from data representative of the P frame comprises generating the first plurality of data segments using an Information Dispersal Algorithm (IDA) for the data representative of the P frame.

20. The non-transitory, computer readable storage medium of claim 15, wherein the processor, responsive to executing the computer instructions, performs operations comprising redundantly distributing data representative of the data frame throughout the respective plurality of data segments to produce a resulting plurality of data segments, the resulting plurality of data segments having a total size greater than the a total size of the data representative of the data frame.

* * * * *